M. C. SCROTE.
CABINET STOVE.
APPLICATION FILED OCT. 11, 1910.

998,208.

Patented July 18, 1911.

3 SHEETS—SHEET 1.

WITNESSES:
Paul E. Baird
C. N. Whitfield

INVENTOR
MERLE C. SCROTE

BY
Bommhardt & Co.
ATTORNEY

M. C. SCROTE.
CABINET STOVE.
APPLICATION FILED OCT. 11, 1910.

998,208.

Patented July 18, 1911.
3 SHEETS—SHEET 2.

WITNESSES:
Paul E. Baird.
C. N. Whitfield

INVENTOR
MERLE C. SCROTE.
BY
Bommhardt & Co.
ATTORNEY

M. C. SCROTE.
CABINET STOVE.
APPLICATION FILED OCT. 11, 1910.

998,208.

Patented July 18, 1911.

3 SHEETS—SHEET 3.

WITNESSES:
Paul E. Baird
C. N. Whitfield

INVENTOR
MERLE C. SCROTE

BY
Bommhardt & Co.
ATTORNEY

UNITED STATES PATENT OFFICE.

MERLE C. SCROTE, OF CLEVELAND, OHIO.

CABINET-STOVE.

998,208.

Specification of Letters Patent.   Patented July 18, 1911.

Application filed October 11, 1910.  Serial No. 586,441.

*To all whom it may concern:*

Be it known that I, MERLE C. SCROTE, a citizen of the United States, residing at Cleveland, in the county of Cuyahoga and State of Ohio, have invented certain new and useful Improvements in Cabinet-Stoves, of which the following is a specification.

This invention relates to cabinet stoves, and comprises a stove and its oven, which are so arranged with respect to a cabinet that they may be inclosed therein and concealed when not in use, the cabinet serving also as a place for the storage of kitchen utensils or other articles.

The stove is available for use by opening the cabinet, and is combined with an oven of novel construction, the oven being so arranged that it can be moved up to operative position or dropped down into the cabinet to inoperative position. Thereby the stove can be used either with or without the oven, and a very compact and convenient structure is provided.

The invention is illustrated in the accompanying drawings in which—

Figure 3:
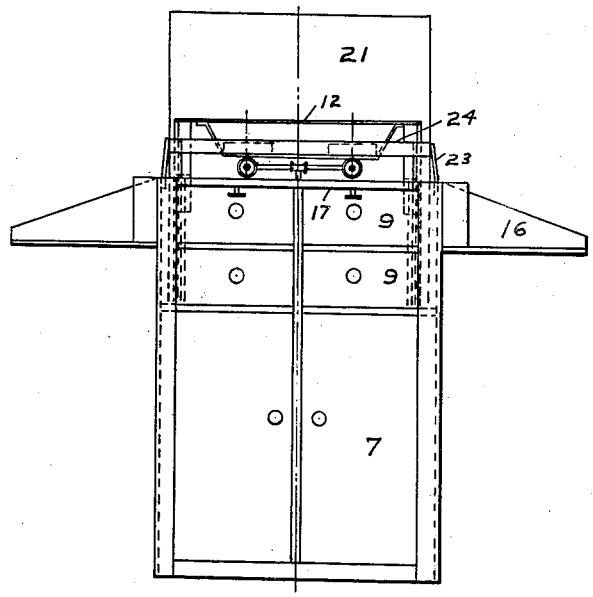
Figure 4:
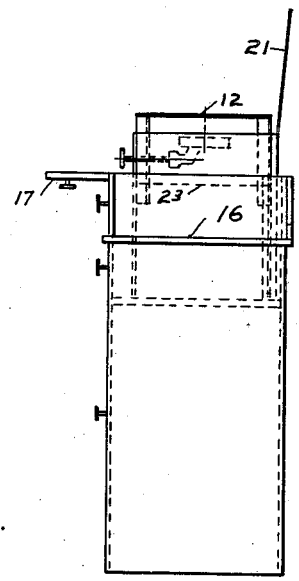
Figure 1:
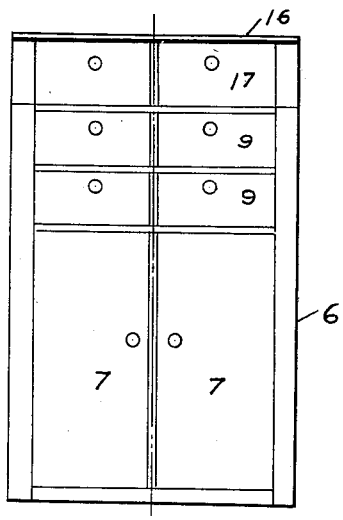
Figure 2:
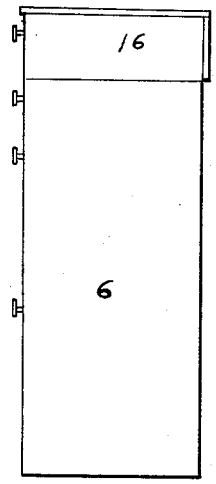
Figure 5:
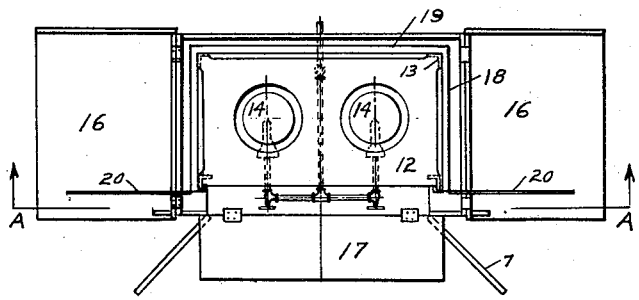
Figure 10:
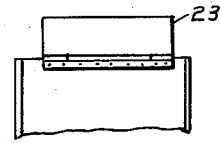
Figure 6:
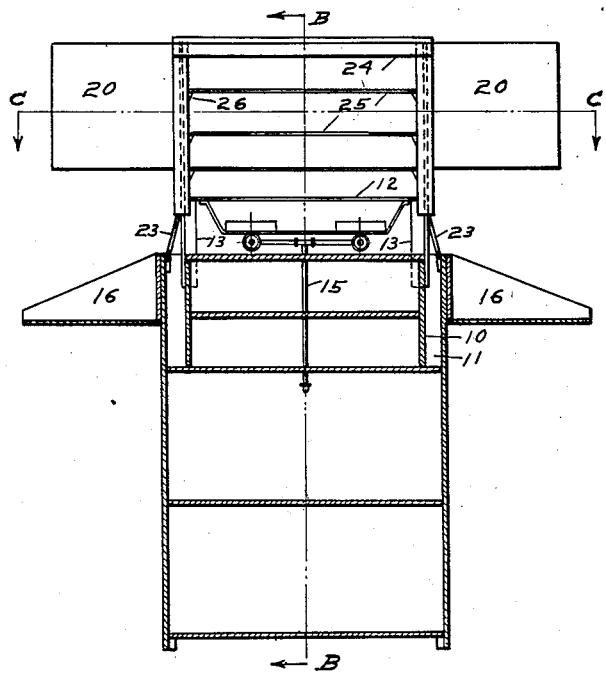
Figure 7:
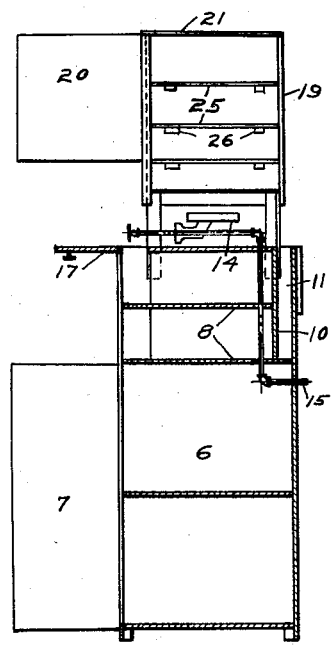
Figure 8:
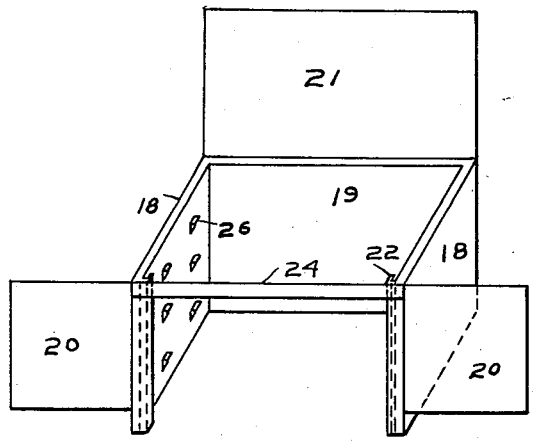
Figure 9:
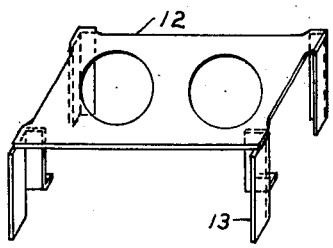

Figure 1 is a front elevation showing the cabinet closed. Fig. 2 is a side elevation. Fig. 3 is a front elevation with the cabinet open, the oven being in lower or inoperative position. Fig. 4 is a side elevation of Fig. 3. Fig. 5 is a top plan view with the cabinet open. Fig. 6 is a section on the line A—A of Fig. 5. Fig. 7 is a section on the line B—B of Fig. 6. Fig. 8 is a perspective detail of the oven removed. Fig. 9 is a perspective detail of the hot plate or stove top. Fig. 10 is a detail of a catch.

Referring specifically to the drawings, 6 indicates a substantially rectangular cabinet, the lower part of which is available as a space for storage and may be provided with shelves as desired. It has front doors 7, and the upper part of the cabinet has shelves 8 on which drawers 9 may slide if desired. Said upper part has false sides or partitions 10 which are spaced as indicated at 11 from the outer or main side and back walls of the cabinet, and this space serves to receive the oven when it is lowered. The stove, proper, is mounted on this inner structure, and comprises a hot or top plate 12 supported by legs 13 at the corners thereof, and burners 14 are located under the openings in this top plate and are supplied with gas from a pipe 15. The top of the cabinet is provided with box covers 16, hinged to the sides thereof and adapted to close the top of the cabinet by swinging over upon the same. When these covers are open, as shown in Figs. 3 to 7, they form convenient shelves at the sides of the cabinet. When closed they conceal the stove and form a top available as a shelf.

A front piece or shelf 17 is hinged to the upper front edge of the cabinet, to swing up within the covers 16 when closed, and down to form a shelf in front of the stove as shown in Figs. 3, 4 and 5, when opened.

The oven consists of side walls 18, a rear wall 19, front doors 20, and a swinging top 21 hinged to the upper edge of the back 19. The walls 18 and 19 fit within the space 11, above referred to, and the front edges of the side walls 18 are flanged as at 22 to form guide grooves which engage the edges of the front legs 13 of the stove top, to hold the oven in proper position, and the oven as a whole may be slid up and down to place the same above or below the stove top. Spring supports or catches 23 serve to hold the oven in raised position when lifted, but these catches may be pressed out to allow the oven to drop. The front doors 20 of the oven are made of sheet metal, and are hinged to the corners of the front walls 18 in such manner that they may be swung to close the front of the oven when the latter is in raised position, or they may be swung around against the sides 18 of the oven when the oven is to be lowered, so that all parts will drop into the spaces 11, and the sheet metal top 21 may either be swung down on top of the oven to close the same when in use, or swung back and down against the back of the oven to slide into the back space 11. A cross strap 24 between the front ends of the sides 18 acts as a stay.

It will be seen that when closed the cabinet incloses the stove and oven and may form an attractive article of furniture. When it is desired to use the stove the covers 16 are opened and the shelf 17 lowered, which exposes the stove top. When baking is to be done, or the oven otherwise used, it is raised to position as shown in Figs. 6 and 7, and held by the catches in position above the stove top. Removable shelves 25 can then be inserted in the oven and supported by suitable projections 26 on the side walls thereof, and by closing the doors 20 and top 21 the oven will be available for use for baking or other purposes.

Having thus described the invention, what I claim as new and desire to secure by Letters Patent is:—

1. The combination of a cabinet openable at the top, a stove therein, and an oven for the stove, supported by the cabinet and movable to position above or below the stove top, the oven having doors in one side wall thereof, and a removable shelf adapted to be inserted in the oven when it is raised above the stove top.

2. The combination of a stove, and an oven the side walls of which are slidable up or down at the sides of the stove, to position above or below the top thereof, said oven having an openable top, to permit use of the stove when the oven is in lowered position.

3. The combination of a stove, a cabinet inclosing the same, with a space between the sides of the stove and those of the cabinet, and an oven the side walls of which are slidable up and down in said space, to locate the same above or below the stove top, the front of the oven having a door therein and the top being openable to permit use of the stove when the oven is lowered.

4. The combination of a stove, and an oven movable up and down thereon, the side and back walls of the oven inclosing the stove when the oven is lowered and forming the oven chamber above the stove top when raised, the top of the oven being hinged to swing down against the back wall thereof, to expose the stove top when the oven is lowered.

5. The combination of a cabinet openable at top and front, a stove in said cabinet, accessible when said top and front are opened, and an oven with side and back walls removably extending around said stove, between the same and the walls of the cabinet, the oven being movable to position above the stove and having hinged front doors and top, substantially as described.

In testimony whereof, I do affix my signature in presence of two witnesses.

MERLE C. SCROTE.

Witnesses:
PAUL E. BAIRD,
CLARA N. WHITFIELD.